(12) United States Patent
Bahr, Jr. et al.

(10) Patent No.: US 6,223,563 B1
(45) Date of Patent: May 1, 2001

(54) PROCESS FOR FABRICATING FLUORINE-DOPED SOL-GEL ARTICLE

(75) Inventors: Charles C Bahr, Jr., Watchung; Suhas Bhandarkar, Glen Gardner; Michael P Bohrer, Lebanon, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,382

(22) Filed: Mar. 17, 2000

(51) Int. Cl.$^7$ ................................................ C03B 37/016
(52) U.S. Cl. ................................ 65/395; 65/397; 65/440; 65/17.2; 65/901; 65/DIG. 16; 264/621; 385/141; 385/144; 385/145; 501/12; 501/40; 501/44; 501/900; 501/905
(58) Field of Search ........................... 65/17.2, 395, 397, 65/440, DIG. 16, 901; 264/621; 385/141, 144, 145; 423/330.1, 338; 501/12, 40, 44, 900, 905

(56) References Cited

U.S. PATENT DOCUMENTS

| | | | |
|---|---|---|---|
| 4,691,990 | 9/1987 | Cohen et al. | 350/96.33 |
| 4,707,174 | 11/1987 | Johnson, Jr. et al. | 65/18.1 |
| 4,840,653 | 6/1989 | Rabinovich | 65/3.12 |
| 5,240,488 | 8/1993 | Chandross et al. | 65/18.4 |
| 5,599,520 | * 2/1997 | Garces et al. | |

OTHER PUBLICATIONS

Shibata, S. "Sol–gel–derived silica preforms for optical fibers," *Journal of Non–Crystalline Solids* 178, p. 272–283 (1994).

Shibata, S. et al., "Fabrication of Fluorine–Doped Silica Glasses By The Sol–Gel Method" *Journal of Non–Crystalline Solids* 100, pp. 269–273 (1988).

Shibata, S. et al., "Wholly–Synthesized Fluorine–Doped Silica Optical Fibers By The Sol–Gel Method" *Technical Digest* 1: 147–50 (1987).

Shinmei, M. et al., "Synthesis Of Fluorine Doped Silica And Its Defluorination Behavior At High Temperature" *High Tech. Ceramics* Part A: 727–736 (1987).

Kitagawa, T. et al., "Fabrication of Single–Mode Optical Fiber Preforms by Sol–Gel Method" *Electronics and Communications in Japan*, pp. 22–28 (1990).

* cited by examiner

Primary Examiner—Michael Colaianni
(74) Attorney, Agent, or Firm—Scott J. Rittman

(57) ABSTRACT

The invention reflects discovery of a liquid phase doping technique that, unlike previous techniques, exhibits very little fluorine depletion upon subsequent heating. The invention involves the steps of providing a silica sol comprising a tetraalkylammonium hydroxide and a di-, tri-, or tetraalkylammonium fluoride, the sol having pH of about 10 to about 14, adding a gelling agent to the sol to induce gelation, casting or extruding the sol to form a gel body, and then drying, heat treating, and sintering the body. Advantageously, the fluorine-containing compound is tetramethylammonium fluoride.

13 Claims, 2 Drawing Sheets

PROCESS FOR FABRICATING FLUORINE-DOPED SOL-GEL ARTICLE

BACKGROUND OF THE INVENTION

1. Field of the Invention

The invention relates to techniques for making fluorine-doped silica glass for use in optical fiber fabrication.

2. Discussion of the Related Art

Optical fiber is produced from a glass preform. The preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

Optical transmission fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform, as discussed in U.S. Pat. No. 4,775,401.

Because the outer cladding of a fiber is distant from transmitted light, the overcladding glass does not have to meet the optical performance specifications to which the core and the inner cladding must conform. For this reason, some efforts to both ease and speed manufacture of fiber preforms have focused on methods of making overcladding tubes. One area of such efforts is the use of a sol-gel casting process.

Co-assigned U.S. Pat. No. 5,240,488 (the '488 patent), the disclosure of which is hereby incorporated by reference, discloses a sol-gel casting process capable of producing crack-free overcladding preform tubes of a kilogram or larger. In the process of the '488 patent, a colloidal silicon dispersion, e.g., fumed silica, is obtained. To maintain adequate stability of the dispersion and prevent agglomeration, the pH is raised to a value of about 11 to about 14 by use of a base, and the dispersion is then aged.

Subsequent to aging, as discussed in Col. 15, lines 39–65 of the '488 patent, a gelling agent such as methyl formate is added to the dispersion to lower the pH. Typically, once the gelling agent is added, but before gelation occurs, the mixture is pumped into a tubular mold containing a central mandrel, and the gel is aged in the mold for 1 to 24 hours. The mandrel is removed, and the gelled body is then extracted from the mold, typically by launching the body from the mold in water to prevent breakage. The body is then dried, heat treated to remove volatile organic materials, water, and metal and oxide particles, and then sintered to form the finished overcladding tube.

In some applications, such as manufacture of ultra-low loss optical fiber, it is desired to modify the index of refraction of the overcladding tube, typically by doping with fluorine (to lower index) or germanium (to raise index). In particular, it is possible for new fiber designs to require one or more overcladding tubes that exhibit an index of refraction lower than pure silica. Various efforts have been made to find a useful technique for doping glass with fluorine, in order to achieve this index-reduction.

Specifically, previous work has explored both liquid and vapor phase doping of silica glasses. In vapor phase doping, porous silica bodies formed by various processes, e.g., sol gel, Vertical Axial Deposition (VAD), or Outside Vapor Phase Oxidation (OVPO) processes, are exposed to gaseous fluorine or fluorine-containing gases such as silicon tetrafluoride at elevated temperatures. Vapor phase doping, however, is typically slow due to the need for the fluorine-containing gas to diffuse into the pores of the silica body. Vapor phase techniques also tend to be relatively inefficient and potentially expensive because only a small fraction of the fluorine is incorporated in the final glass body. The incorporation of fluorine by vapor phase is governed by the thermodynamic equilibrium of the following reaction:

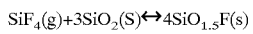

$$SiF_4(g) + 3SiO_2(S) \leftrightarrow 4SiO_{1.5}F(s)$$

This reaction is typically carried out at temperatures ranging from 900 to 1100° C. and requires an atmosphere of $SiF_4$ to prevent loss of fluorine from the glass due to the reverse reaction. In particular, heating a fluorine-doped porous body in the absence of such a fluorine-containing atmosphere generally results in unacceptable depletion of the F concentration.

Liquid phase (or solution) doping offers the potential advantage of controlled and uniform levels of doping throughout a glass body. Liquid phase doping using conventional alkoxide sol gel techniques have been reported. (See S. Shibata, "Sol-gel derived silica preforms for optical fibers," *Journal of Non-Crystalline Solids*, Vol. 178, 272, 1994; Shibata et al., "Fabrication of Fluorine-Doped Silica Glasses by the Sol-Gel Method," *Journal of Non-Crystalline Solids*, Vol. 100, 269, 1988) This work typically uses fluorinated silicon alkoxides (such as $Si(OC_2H_5)_3F$) although reagents such as HF and $H_2SiF_6$ have also been used with conventional silicon alkoxides—though with less success (see M. Shilmei et al., "Synthesis of Fluorine Doped Silica and its Defluorination Behavior at High Temperature," *High Tech Ceramics*, P. Vincenzini, ed., Elsevier Science Publishers, 1987.). Shinmei et al., supra, also report hydrolysis of $SiF_4$ in water to make F-doped silica particles that are subsequently dehydrated and polymerized to make gels.

However, such liquid phase doping techniques encounter some of the same problems as vapor phase doping Specifically, as mentioned above, in a typical sol gel process for making overcladding tubes or optical fiber preforms, the bodies undergo steps of drying, heating to burnout organic species, heating in the presence species that remove bound water and purify the silica, and finally heating to sinter to glass. As noted above, however, heating of fluorine-doped silica bodies in the absence of a fluorine-containing gas environment causes depletion of the fluorine by the reverse of the above reaction. In fact, Shinmei et al., supra, report that fluorine-doped sol gel powders made by two different solution doping techniques easily lost fluorine when heated in air. In particular, fluorine loss began at temperatures as low as 450° C. and was nearly complete when the sample reached 1000° C. Kitagawa et al., "Fabrication of Single-Mode Optical Fiber Preforms by Sol-Gel Method," *Electronics and Communications in Japan*, Part 2, Vol. 73, No. 6, 22, 1990, report using a solution doping technique involving forming a sol-gel tube by an alkoxide process, followed by drying and a quick sintering at 1350° C. These authors actually rely on the relatively significant out-diffusion of fluorine at elevated temperatures to form a fluorine-depleted region on the inside surface of the glass cylinder. In this manner, after the tube is collapsed to a rod, the resulting preform contains a silica core with down-doped outer region.

These results suggest that although solution doping with F-containing species is able to provide usable levels of F-doping, subsequent heat treatments to burnout organic species, dehydroxylate, purify and sinter the body will cause loss of F, resulting in a non-uniform and poorly controlled profile, unless steps are taken to maintain a F-containing atmosphere during such heat treatments. Maintaining such an atmosphere is potentially expensive due to the cost of F-containing gases and difficult due to the corrosive nature of these gases.

Note also co-assigned U.S. Pat. Nos. 4,707,174 and 4,840,653 (the '174 and '653 patents, respectively), which discuss both liquid phase and vapor phase fluorine-doping techniques for purposes of avoiding bubble formation during reheating of previously-sintered glass. In one embodiment, the liquid phase doping techniques of these patents involve formation of a silica sol, drying of the sol, and then milling or blending of this pre-dried sol with an aqueous solution of a fluorine-containing material. This embodiment is thus an indirect doping process, in which a silica sol is first formed, and then later doped with fluorine by way of a mechanical mixing process. In another embodiment, a conventional alkoxide sol-gel process involving tetraethyl orthosilicate (TEOS) is performed in the presence of ammonium fluoride, such that the resultant silica contains fluorine. The '174 and 653 patents do not disclose a fluorine-doping technique with a colloidal sol-gel process of the type disclosed in U.S. Pat. No. 5,240,488, i.e., a sol-gel process that involves stabilization of silica particles with TMAH, followed by addition of a gelling agent. Thus, the applicability of the disclosed techniques to such a process is not clear.

Thus, alternative techniques for fluorine-doping in silica sol-gel bodies, advantageously where such techniques do not require a fluorine atmosphere during heat treatments, would be desirable, particularly for sol-gel bodies of the type formed from the process of the '488 patent.

SUMMARY OF THE INVENTION

The invention relates to a process for fabricating a fluorine-doped silica article by use of a sol-gel technique of the type disclosed in U.S. Pat. No. 5,240,488. In particular, the invention involves a liquid phase doping technique that, unlike previous techniques, exhibits very little fluorine depletion upon subsequent heating. The invention involves the steps of providing a silica sol comprising a tetraalkylammonium hydroxide and a di-, tri-, or tetra-alkylammonium fluoride, the sol having pH of about 10 to about 14, adding a gelling agent to the sol to induce gelation, casting or extruding the sol to form a gel body, and then drying, heat treating, and sintering the body. (Sol, as used herein, encompasses both particular silica dispersions, e.g., using fumed silica, as well as silicate solutions, e.g., tetramethylammonium silicate.) Advantageously, the fluorine-containing compound is tetramethylammonium fluoride, which induces very little change in pH, and also contributes tetramethylammonium cations, which are believed to help maintain the stability of the silica sol.

Surprisingly, during the drying, heat treatment, and sintering, the body retains a substantial amount of the fluorine introduced into the sol, without the need for a fluorine-containing environment or additional fluorine-containing material. In fact, for fluorine to silica weight ratios of 0.7:100 and below, the body appears to retain substantially all of the introduced fluorine. This result is particularly unexpected given the reported results discussed above, and constitutes a significant discovery of an easier and less expensive technique to obtain fluorine-doped silica, in particular doped overcladding tubes for fabrication of ultra-low loss optical fiber. Moreover, it is possible according to the invention to attain uniform, low levels of fluorine doping, in contrast to vapor phase techniques.

The invention also constitutes an improvement and distinction over co-assigned U.S. Pat. Nos. 4,707,174 and 4,840,653, discussed above. In particular, the sol-gel techniques of the '174 and '653 patents that can be deemed "colloidal" involve either (a) mixing fumed silica with water, drying the resultant mixture, and then milling or blending the dried material with more water (see, e.g., Example 1 of both patents) or (b) forming an alkoxide gel, drying the gel, milling or blending the gelled material, and redispersing the resultant material in a liquid to form a suspension (see Col. 6, line 61 to Col. 7, line 9 of the '653 patent). And the liquid-phase fluorine doping used with these "colloidal" methods involves further milling or blending of the resultant material with a fluorine-containing compound.

These techniques of the '174 and '653 patents thus do not disclose the doping technique of the invention, i.e., they do not disclose how one would use liquid phase fluorine doping with a colloidal sol-gel process of the type disclosed by the '488 patent, i.e., in which a base is used to stabilize the sol, followed by addition of a gelling agent to induce gelation. In fact, it was discovered that use of the HF or NH4F disclosed and suggested by these patents caused instability and thus premature gelation with a sol-gel process of the type used in the invention. See, e.g., the comparative examples below, in particular Example 9.

DETAILED DESCRIPTION OF THE INVENTION

Figure 1:
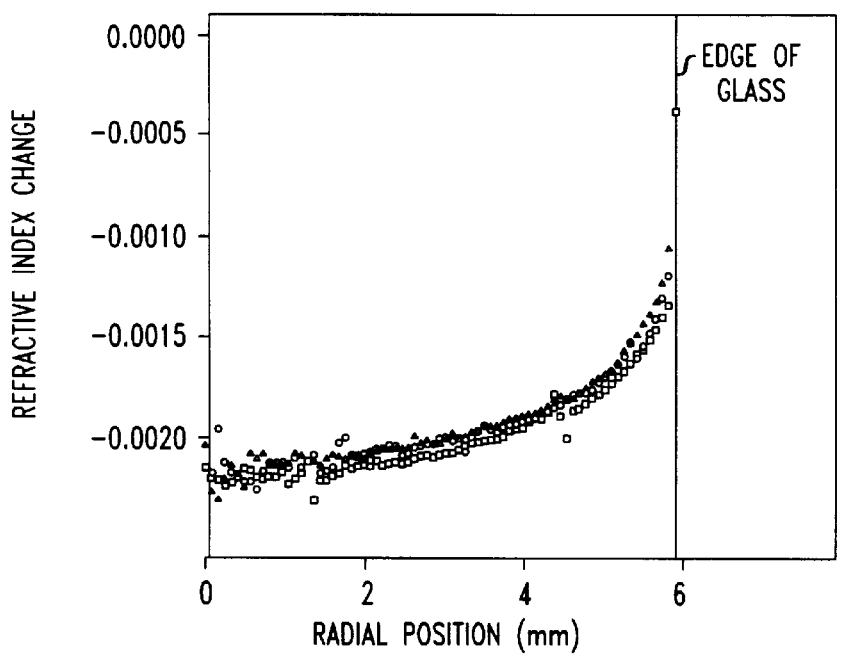
FIG. 1 shows a refractive index profile of a silica body formed according to an embodiment of the invention.

According to one embodiment of the invention, an aqueous stabilized silica dispersion, or sol, is provided. The dispersion typically contains about 30 to about 75 wt. % silica, advantageously about 40 to about 65 wt. % silica, with the surface area of the silica generally ranging from 5 to 100 m$^2$/g. The dispersion is stabilized by conventional methods, typically at a pH greater than about 10, generally about 10 to about 14. Stabilization is generally provided by adding tetramethylammonium hydroxide (TMAH), as discussed in U.S. Pat. No. 5,240,488. The TMAH is typically added in an amount up to about 3 wt. %. Other organic bases, including other tetraalkylammonium hydroxides, are also suitable. Polymeric materials are typically included as well, such as discussed in the '488 patent.

To the sol is added a fluorine-containing compound. (As used herein, fluorine-containing compound indicates one or more such compounds.) The added fluorine-containing compound must be carefully selected, in that it should not significantly change the pH or stability of the sol, both of which could cause premature gelation or aggregation/precipitation. The fluorine generally needs to be ionizable, as well, in order to provide the desired doping. Typically a di-, tri-, or tetraalkylammonium fluoride is selected. Advantageously, tetramethylammonium fluoride (TMAF) is added. TMAF is advantageous in that it has a relatively minor effect on the pH and the TMA cations are believed to aid in formation of stable, electrostatically-protected silica particles at high pH. (The term add, as used herein, also encompasses addition of two or more reagents that together result in formation of the di-, tri-, or tetraalkylammonium fluoride. Such an addition is referred to herein as an in situ addition. For example, it is possible to add HF where additional TMAH is present to maintain pH and stability, since HF and TMAH will react to form TMAF.)

In contrast to the desirable results provided by TMAF, it was discovered that adding HF, without sufficient additional TMAH, or adding NH$_4$F, tended to destabilize the sol, leading to premature gelation. Specifically, as noted above, these compounds do in fact change the pH and/or stability of the sol. Thus, both compounds are disadvantageous, as reflected in the comparative examples below. Moreover, as noted above, this discovery of the relative disadvantages of these compounds shows the uniqueness and distinction of the invention over the processes of U.S. Pat. Nos. 4,707,174 and 4,840,653, both of which list these materials as preferred compounds.

The fluorine-containing compound is typically added in an amount that provides a fluorine to silica weight ratio of greater than 0 to 3:100.

The dispersion is typically aged for at least 24 hours, more typically 24 to 48 hours, to adequately dissolve the silica. The dispersion is then optionally centrifuged to remove contaminants—see co-assigned U.S. Pat. No. 5,344,475

A gelling agent is subsequently added to drop the pH of the dispersion to the gel point. Generally, up to about 5 wt. % of the gelling agent is suitable, based on the weight of the dispersion. The gelling agent is typically a water-soluble liquid that undergoes hydrolysis to consume base, e.g., an ester, amide, or halide, and thereby lowers the pH. Methyl formate is a typical gelling agent.

After adding the gelling agent, the dispersion is typically transferred into a mold or an extruder, where it is allowed to gel. Gelling typically occurs over a time period of about 15 minutes to about 20 hours. Where the gel body is molded, the gel is then typically allowed to age in the mold for about 5 to 30 hours. For extrusion, the gel generally ages for a few hours or less. Aging provides continued siloxane bond formation and a desirable rearrangement of particles, leading to better packing, expulsion of some liquid around the particles, and associated shrinkage of the gel in the mold—a process known as syneresis. Syneresis adds strength and, due to the shrinkage, eases removal from a mold. Once aged, the gel is released from the mold, or extruded into the desired shape. (In the case of articles other than overcladding tubes, e.g., planar waveguide structures, the aged gel is formed into the desired shape or layer, and the term casting is intended to include liquid phase deposition techniques such as spinning/dip coating of films or screen-printing.)

The gel is then dried, typically under relatively moderate conditions, e.g., temperature less than 25° C. and relative humidity greater than 50%, to about 20% weight loss, followed by drying at higher temperatures and higher humidity, to about 40 to 50% weight loss.

The dried body is then typically heated to remove residual water and organics, and to purify the material. Most of the organic materials are able to be removed by thermal decomposition in nitrogen at temperatures of at least 300° C. (typically less than 400° C.). Air is introduced, generally at a temperature of at least 300° C. (but typically less than 450° C.) to burn out any remaining organics.

After this burnout, the porous silica body still contains surface-bound hydroxyl groups as well as metal or metal oxides that were present in the original silica. To remove these materials, chlorine and/or thionyl chloride are typically introduced at temperatures of 650 to 950° C. to remove the bound hydroxyl groups and to volatize metal impurities by formation of metal chlorides. In addition, metal oxides are actively etched by the chlorine-containing gases and removed as volatile chloride species (see, e.g., co-assigned U.S. Pat. No. 5,356,447). This step is typically referred to as dehydroxylation and purification.

After such heat treatment (processes that provide the results of the burnout, dehydroxylation, and purification steps are collectively referred to herein as a heat treatment step), the highly-pure silica body is sintered to form a clear glass body. Typically, sintering is performed in a helium or helium/oxygen atmosphere, at a temperature of 1300 to 1500° C.

The process of the invention is capable of forming relatively large, crack-free, doped-silica bodies, e.g., at least 1 kg, typically at least 5 kg, as sintered. Control runs are easily performed to determine appropriate drying, burnout, dehydroxylation/purification, and sintering conditions for a given set of parameters. The incorporation of the fluorine-containing compound is also applicable to similar sol-gel techniques which contains some variations from the above embodiment.

Overcladding tubes, or other bodies, prepared according to the invention are capable of being formed into optical fiber preforms according to any suitable technique, and optical fiber is capable of being drawn. As reflected in the examples below, bodies formed according to the invention have a substantially uniform refractive index that is about 0.2 to about 0.3% less than the refractive index of pure silica (with a slightly lower index at the outer edge due to fluorine loss). (In addition, as mentioned above, the doped silica formed according to the invention is capable of use in other applications, e.g., planar waveguide structures formed by spinning-on or dip-coating of the silica.)

Significantly, use of the liquid phase fluorine doping according to the invention appears to be substantially resistant to fluorine depletion during the drying, heat treatment, and sintering steps, even without a fluorine-containing environment. Based on previous, reported work, discussed above, one would not expect such a result without such a fluorine-containing environment during these steps. While experimental work, shown in the examples below, has indicated that, in this embodiment of the invention, higher temperature treatments, e.g., 950° C. vs. 650° C., and/or more aggressive atmospheres ($SOCl_2$ in the absence of oxygen vs. $SOCl_2$ in air) tend to result in slightly more fluorine-removal, the extent of out-diffusion is far below what would be expected.

In particular, for a sol containing TMAH and TMAF, at a fluorine to silica weight ratio of 0.7:100 or less, substantially all the fluorine introduced by the TMAF into the silica sol appears to be present in the as-sintered body. At higher amounts of TMAF, incorporation of fluorine drops below the stoichiometric level, and stays at about 0.3% normalized refractive index reduction (which is equivalent to a doping level of about 1.1 g fluorine per 100 g silica).

The invention will be further clarified by the following examples, which are intended to be exemplary. (In all examples, the silica is fumed silica having a nominal diameter of 50 nm.)

EXAMPLE 1

A dispersion of silica in water containing 46 wt. % silica with 0.35 wt. % TMAH was obtained. Additional TMAH was added to give a final concentration of about 1.5 wt. %. Glycerin and a polymer binder solution (10.7 wt. % polyethyloxazoline in water) were added to give final concentrations of about 0.5 wt. % glycerin and 0.1 wt. % polymer. The dispersion was mixed by vigorous shaking and then a TMAF solution (23.0 wt. % TMAF in water) was added to give a doping level of 1.5g F/100 g $SiO_2$. The dispersion was again mixed by shaking, and then aged overnight. (The pH of the shaken dispersion was about 9.8.) (The TMAF solution had been prepared by slowly dripping 50 wt. % HF into a stirred, chilled beaker of 25 wt. % TMAH in the ratio of 10 g HF solution to 91.0 g of TMAH solution. It is also possible to prepare TMAF solutions by dissolving hydrated TMAF solids (TMAF•5$H_2O$) in water or by adding the solids directly to the dispersion.) Small cylindrical samples were prepared by mixing 200 g of the above dispersion with 2 g of a methyl formate/octanol solution (0.58 g octanol/100 g methyl formate), and then pouring the mixture into stoppered quartz tubes (2×20 cm) that had been cleaned and sprayed with a silicone mold release agent. The solution gelled within about 10 minutes and was allowed to age in the stoppered, glass mold overnight.

The gel cylinders were removed the following day by gently pushing onto a metal screen, and were dried in a temperature and humidity controlled chamber (about 20° C. and about 35% relative humidity) for between 24 and 48 hours. The samples lost 50 to 60% of their original weight upon drying.

The dried gel bodies were next treated in a small tubular, horizontal furnace to remove residual water and burn out organic species. Specifically, the cylindrical pieces were placed on a quartz boat in the center of the furnace and heated in nitrogen (2 slm) up to 300° C. over 8 hours. Next, air was introduced while continuing to ramp up the temperature to 375° C. over 150 minutes, then up to 450° C. over 2 hours. As air continued to flow, the temperature was allowed to slowly return to room temperature.

Next, the samples were dehydroxylated by exposure to thionyl chloride at elevated temperature. Specifically, the samples were placed on a silica boat in the center of the horizontal tube furnace and heated to 650° C. over 5 hours with a low airflow (670 sccm). While holding at 650° C., thionyl chloride ($SOCl_2$) was introduced into the furnace by passing the airflow through a glass bubbler containing liquid thionyl chloride at room temperature. The partial pressure of thionyl chloride was approximately 0.17 atm. After two hours, the thionyl chloride flow was stopped and 670 sccm of pure nitrogen was introduced into the furnace for an additional 2 hours. The furnace temperature was then ramped up to 950° C. over 3 hours, and subsequently held at 950° C. for 1 hour with 670 sccm of nitrogen. Finally, the furnace was turned off and allowed to cool with nitrogen flowing.

The silica pieces were then sintered in a small horizontal furnace by heating to 1400° C. at 500 ° C./hour in 600 sccm helium flow, holding for 1 hour at 1400° C., and then cooling to room temperature over several hours.

The clear, sintered glass cylinders were then mounted in a Photon Kinetics Model 2600 Refractive Index Profiler equipped with a constant temperature bath to measure the refractive index (RI). The refractive index profile across the diameter of one of the glass cylinders is shown in FIG. 1. the RI was found to average −0.19% below that of pure silica.

Comparative Example 2

Samples were prepared in the same manner as example 1 with the exception that water was substituted for the TMAF solution, resulting in gel samples with no added fluorine. RI measurements showed the sample to have the same RI as pure silica.

EXAMPLE 3

Three samples were prepared according to the procedure of Example 1, with fluorine levels of 2 g F/100 g $SiO_2$. The samples were heat treated as follows. Sample 1 was treated exactly as in Example 1. Sample 2 was treated as in Example 1, but received 4 hours of the air/$SOCl_2$ treatment at 950° C. instead of 650° C. Sample 3 was treated as in Example 1, but received 2 hours of the air/$SOCl_2$ treatment at 650° C. followed by 2 hours of $N2$/$SOCl_2$ at 650° C., at 17 vol.% $SOCl_2$. The average index reduction for the three samples relative to pure silica (ARI) is shown below:

| Sample | Δ RI (%) |
|---|---|
| Sample 1 | −0.31 |
| Sample 2 | −0.28 |
| Sample 3 | −0.26 |

EXAMPLE 4

Figure 2:
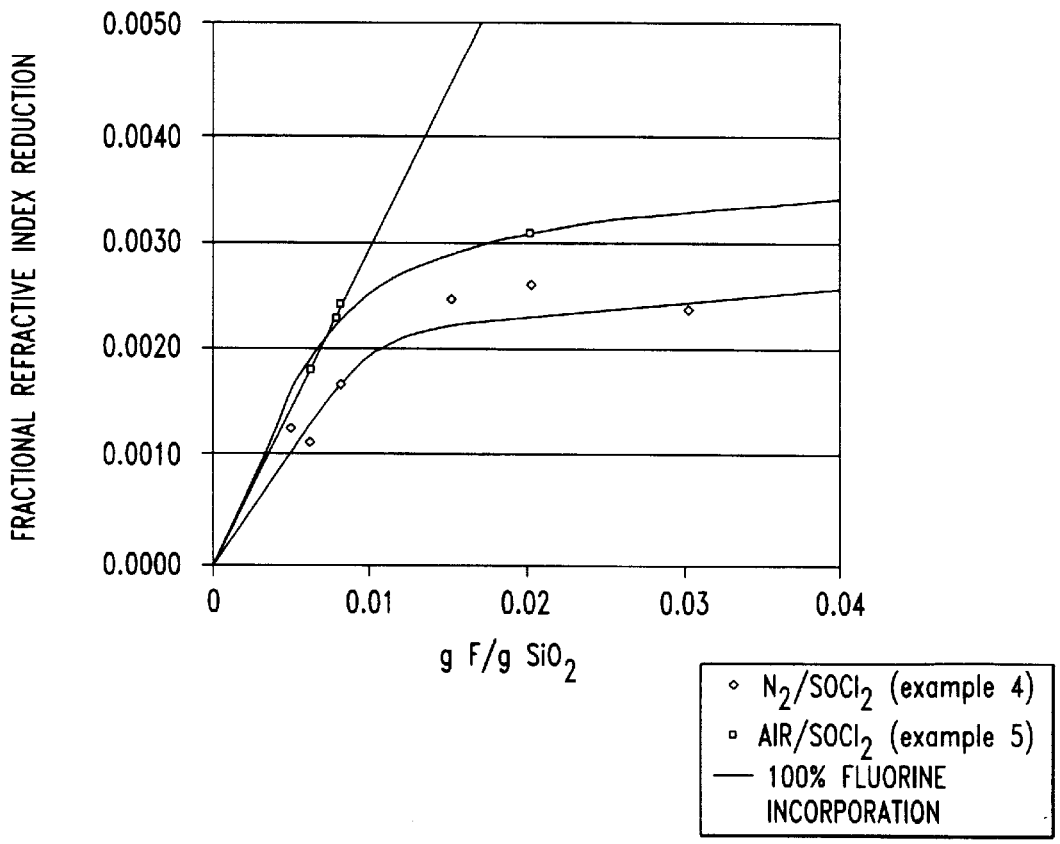
FIG. 2 shows the effect of increased fluorine doping on the refractive index of bodies formed according to an embodiment of the invention.

A series of samples were prepared according to the procedure of Example 1, with levels of fluorine-doping ranging from 0.506 to 3.01 g F/100 g $SiO_2$. The thionyl chloride treatment was the same as Sample 3 in Example 3, i.e., air/$SOCl_2$ followed by nitrogen/$SOCl_2$). The refractive index reduction was found to increase with increasing fluorine concentration, as shown in FIG. 2 (as a fraction of the index of silica).

EXAMPLE 5

A series of samples were prepared according to the procedure of Example 1 with F-doping levels ranging from 0.633 to 2.01 g F/100 g $SiO_2$. (The thionyl chloride treatment was also the same as in Example 1, i.e., air/$SOCl_2$ only.) The refractive index reduction was found to increase with increasing fluorine concentration, as shown in FIG. 2. The level of fluorine incorporation was equal to 100% (based on RI reduction) for doping levels up and including 0.792 g F/100 g $SiO_2$, but leveled off at higher concentrations.

EXAMPLE 6

A cylindrical sol gel body doped with 1.0 g F/100 g $SiO_2$ was made by pumping the fluorine-doped sol prepared according to example 1 into a stainless steel cylindrical mold (3.12 inch ID) equipped with a stainless steel mandrel (1.18 inch OD). The body was allowed to age overnight and then the mandrel was removed and the wet gel body was pushed out of the mold onto a set of fluoropolymer coated rollers. The rollers and gel body were placed in a dryer and dried for 7 days under controlled temperature and humidity conditions −16° C. and 50% relative humidity ramped to 25° C. and 32% relative humidity. The body was rotated slowly to dry uniformly.

The dried body was then treated in a large vertical furnace to burnout organic species and to remove bound water. Specifically, the body was treated as follows: (1) the body was heated to 350° C. in nitrogen over 14.5 hours, (2) the temperature was raised to 850° C. over 10 hours in air, (3) the temperature was raised to 950° C. over 2 hours in air/chlorine (9 vol.% $Cl_2$), (4) the temperature was held at 950° C. in nitrogen/chlorine (10% $Cl_2$), and (5) the body was cooled in nitrogen over several hours. The dehydroxylated body was then removed form the furnace, and sintered in He at 1400° C. by lowering at 10 mm/min through a furnace.

Figure 3:
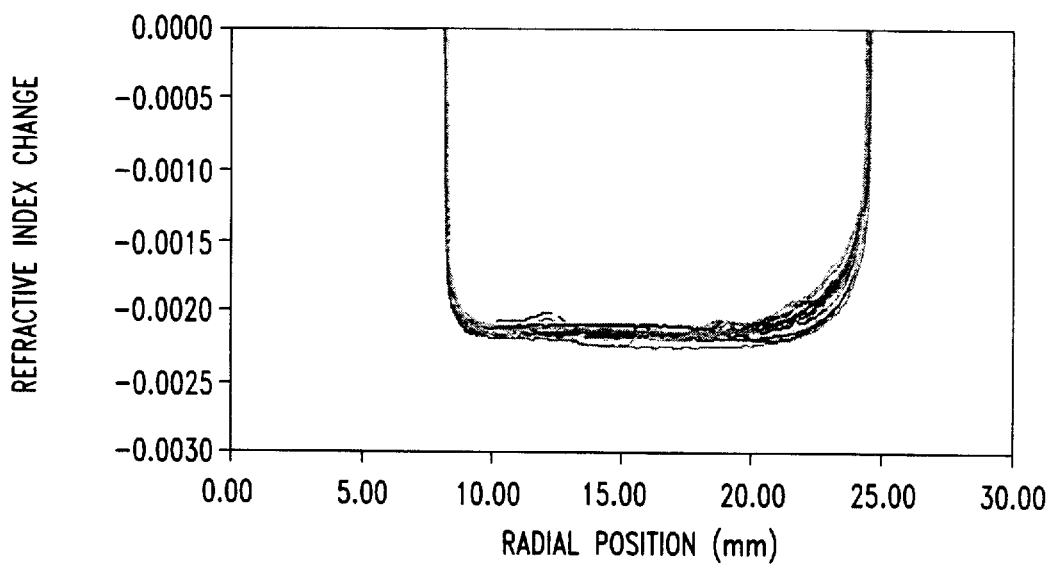
FIG. 3 shows a refractive index profile of a silica body formed according to the invention.

The refractive index profile across the diameter of the clear sintered glass was measured at various axial positions, with the results shown in FIG. 3. The average index reduction was −0.22% and excellent uniformity was found in both the radial and axial directions along the tube.

EXAMPLE 7

Figure 4:
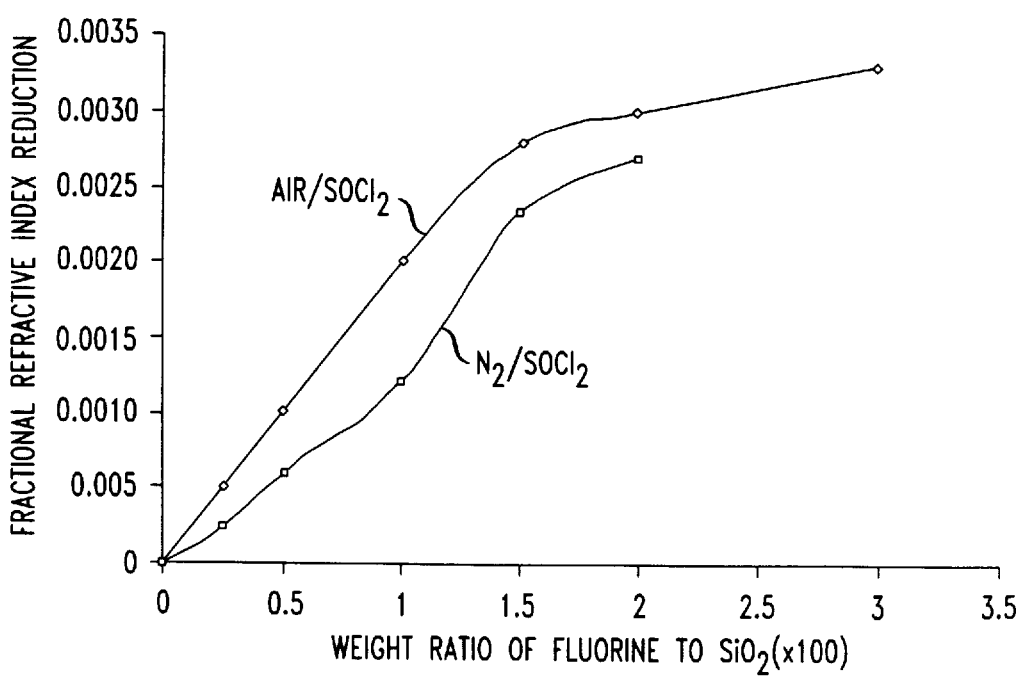
FIG. 4 shows the effect of increased fluorine doping on the refractive index of bodies formed according to an embodiment of the invention.

A series of fluorine-doped gel samples were made by gelling the sol at a higher pH (pH-11.2) than in the procedure of Example 1. A sol containing 55 wt. % $SiO_2$, 0.6% tris (2-aminoethyl) amine, and 1.5% TMAH was aged for 72 hours, then mixed with TMAF·$5H_2O$ and then gelled without any further aging. The TMAF content was adjusted such that the F to $SiO_2$ weight ratio ranged between 0.0025 and 0.03. The sol was then mixed with methyl 2-hydroxyisobutyrate (1.3 gms per 100 gms of sol) to induce gelation and poured into tubes 5 cm in diameter by 10 cm in length. Drying was performed at about 20° C. and 40% relative humidity for about 100 hours. The residual water and organics were burned out as in Example 1, and then the samples were exposed to 17 vol.% $SOCl_2$ in air or 17 vol.% $SOCl_2$ in $N_2$, at 650° C. FIG. 4 shows the index change of the final glass as a function of the initial F/$SiO_2$ weight ratio, for both $SOCl_2$ treatments (as a fraction of the index of silica).

Comparative Example 8

A sol containing 55 wt. % $SiO_2$, 0.6% tris (2-aminoethyl) amine, and 1.5% TMAH was aged for 72 hours, and then gelled at a pH of 11.2 by adding 3 wt. % hydroxyethyl trifluoroacetamide or 3 wt. % di(hydroxyethyl) trifluoroacetamide, and then processing the material as in Example 7. In this fluorine-containing material, the fluorine is bound to the carbon and is not ionizable. The gels were dried and heat treated as described in Example 1. The final index of the glass was unchanged from that of pure $SiO_2$, due, apparently to the inability of the fluorine to ionize. Loss of fluorine was in the form of volatile fluoroform, which was detected in the furnace effluent using FTIR.

Comparative Example 9

Three dispersions at 30, 46 and 55 wt. % $SiO_2$ were made using either 1 or 2 wt % HF, $NH_4F$ or $(NH_4)_2SiF_6$ as the electrolytes. All the dispersions exhibited pseudo-plastic behavior, i.e., they exhibited gel-like characteristics unacceptable for handling and transport in a manufacturing environment.

Comparative Example 10

A 46 wt. % $SiO_2$ sol stabilized with 1.5% TMAH was mixed with either 1 or 2% wt HF, $NH_4F$, $(NH_4)_2SiF_6$ or $H_2SiF_6$. Gelling was immediate and consequently, inhomogeneous. There was no time for casting the sol in to a mold after the mixing of the gelling agent, making these materials similarly inappropriate for handling and transport in a manufacturing environment.

Comparative Example 11

A 55 wt. % $SiO_2$ sol was made using 0.1% to 4 wt % TMAF, in the absence of TMAH. In these sols, the silica particles were slightly positively charged with a zeta potential of about 25 mV. At the higher TMAF levels (>2 wt %), these sols showed a minimum in viscosity of about 85 cp. These viscosities increased sharply with time in the absence of shear. These flow properties are generally not suitable for handling and transport in a manufacturing environment.

Comparative Example 12

A 55 wt. % $SiO_2$ sol stabilized with 1.5% TMAH was mixed with alkali and alkaline-earth metal (Li, Na, K, Ca) fluoride salts. The addition of the salts caused the sol to destabilize, inducing rapid agglomeration of the silica particles into large globules. Where the concentration of the salt was high enough, such as for ~4 wt. % NaF and 0.5 wt. % $CaF_2$, the sol eventually gelled. This inhomogeneous gelation, as well as diversification that occurred upon sintering, rendered the samples unusable, indicating that metal fluoride salts are not appropriate sources of fluorine in TMAH-stabilized silica sols.

Comparative Example 13

A 46 wt. % $SiO_2$ sol stabilized with 1.5% TMAH, was aged at least 72 hours and was then mixed with methyl formate (1 gm per 100 gms of sol), and poured into molds to form rods (4 cm diameter and 10 cm length). At this point, the gelled rods had a porosity of about 61 vol. %. One rod was then immersed in an aqueous solution of 1.72 wt. % $NH_4F$ and another in a solution of 4.32 wt. % TMAF, both for 24 hours, to completely saturate the bodies. The rods were then dried and heat-treated as described in Example 1 to remove all water and organics.

If all the fluorine from the permeating solution were to be retained, an index change of −0.2% would be expected. However, only a −0.1% index change was observed in the final glass. When the rods were saturated in solutions with twice the above stated strength, the final index jumped up to −0.2%, again retaining only about 50% of the fluorine. With further increases in the fluorine concentration, the loss of fluorine became severe—the maximum change in index that could be achieved was −0.3%. The loss of fluorine was evidenced in the form of crystalline $(NH_4)_2SiF_6$, which was identified as a white scale depositing on the downstream end of the furnace muffle.

Comparative Example 14

To consider reducing the organic content per F atom, tetramethylammonium hexafluorophophate or tetramethylammonium tetrafluoroborate was used instead of TMAF in the processes of Examples 1 and 7. As in the case of TMAF, these salts did not interfere with the gelation, apparently due to the presence of the TMA ion. However, the presence of hygroscopic boron resulted in hydrated crystals on the gel surface, which was unacceptable. The phosphorus-containing gel could not be sintered to clarity, and thus was similarly unacceptable.

Other embodiments of the invention will be apparent to those skilled in the art from consideration of the specification and practice of the invention disclosed herein.

What is claimed is:

1. A process for fabricating an article, comprising the steps of:
   providing a silica sol comprising a tetraalkylammonium hydroxide and a di-, tri-, or tetra-alkylammonium fluoride, the sol having pH of about 10 to about 14;
   adding a gelling agent to the sol to induce gelation;
   casting or extruding the sol to form a gel body;
   drying the gel body;
   heat treating the dried body; and
   sintering the heat treated body to form a sintered body.

2. The process of claim 1, wherein the sol comprises tetramethylammonium hydroxide.

3. The process of claim 2, wherein the sol comprises tetramethylammonium fluoride.

4. The process of claim 3, wherein a weight ratio of fluorine to silica in the sol is greater than 0 to 3:100.

5. The process of claim 1, wherein a refractive index reduction of the sintered body relative to pure silica is about 0.2% to about 0.3%.

6. The process of claim 5, wherein the process is performed in the absence of a step of introducing a fluorine-containing compound subsequent to providing the silica sol, and in the absence of a step of providing a fluorine-containing environment during drying, heat treating, or sintering.

7. The process of claim 1, wherein a weight ratio of fluorine to silica in the sol is 0.7:100 or less.

8. The process of claim 7, wherein substantially all fluorine introduced by the di-, tri-, or tetra-alkylammonium fluoride remains in the sintered body, in the absence of a step of providing a fluorine-containing environment during drying, heat treating, or sintering.

9. The process of claim 1, further comprising the steps of:
   forming an optical fiber preform incorporating the sintered body; and
   drawing fiber from the preform.

10. The process of claim 1, wherein the process is performed in the absence of a step of introducing a fluorine-containing compound subsequent to providing the silica sol, and in the absence of a step of providing a fluorine-containing environment during drying, heat treating, or sintering.

11. The process of claim 1, wherein the sintered body is at least 1 kg.

12. The process of claim 11, wherein the sintered body is at least 5 kg.

13. The process of claim 3, wherein the tetramethylammonium fluoride is added to the sol by a technique other than in situ.

* * * * *